United States Patent
Chen et al.

(10) Patent No.: US 8,438,283 B2
(45) Date of Patent: May 7, 2013

(54) METHOD AND APPARATUS OF DYNAMICALLY ALLOCATING RESOURCES ACROSS MULTIPLE VIRTUAL MACHINES

(75) Inventors: Ying Chen, Beijing (CN); Qing Bo Wang, Beijing (CN); Zhe Xiang, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/363,106

(22) Filed: Jan. 30, 2009

(65) Prior Publication Data

US 2009/0198766 A1  Aug. 6, 2009

(30) Foreign Application Priority Data

Jan. 31, 2008 (CN) .......................... 2008 1 0004964

(51) Int. Cl.
*G06F 15/173* (2006.01)
*G06F 9/455* (2006.01)

(52) U.S. Cl.
USPC .............................................. 709/226; 718/1

(58) Field of Classification Search ................. 709/224, 709/226; 718/1
See application file for complete search history.

(56) References Cited

U.S. PATENT DOCUMENTS

| | | | | |
|---|---|---|---|---|
| 6,594,234 B1 * | 7/2003 | Chard et al. | ................. | 370/236 |
| 2004/0003085 A1 * | 1/2004 | Joseph et al. | ................. | 709/226 |
| 2005/0060663 A1 * | 3/2005 | Arkeketa et al. | ............... | 715/810 |
| 2005/0262505 A1 | 11/2005 | Esfahany | | |
| 2006/0143617 A1 | 6/2006 | Knauerhase | | |
| 2006/0184937 A1 * | 8/2006 | Abels et al. | ........................ | 718/1 |
| 2007/0067435 A1 | 3/2007 | Landis | | |
| 2007/0079308 A1 * | 4/2007 | Chiaramonte et al. | ............ | 718/1 |
| 2007/0110046 A1 * | 5/2007 | Farrell et al. | .................. | 370/389 |
| 2007/0214456 A1 | 9/2007 | Casey | | |
| 2008/0126580 A1 * | 5/2008 | Tripathi et al. | .................... | 710/5 |
| 2008/0162735 A1 * | 7/2008 | Voigt et al. | ........................ | 710/6 |

FOREIGN PATENT DOCUMENTS

| | | |
|---|---|---|
| WO | WO2007041289 A1 | 4/2007 |
| WO | WO2007055844 A2 | 5/2007 |

* cited by examiner

*Primary Examiner* — Jeong S Park
(74) *Attorney, Agent, or Firm* — Vazken Alexanian

(57) ABSTRACT

An apparatus and method for dynamically allocating resources across multiple virtual machines. The method monitors the activities of the applications in each virtual machine running on a hosting server, determines the activities of the applications in each virtual machine based on the activities of the monitored applications, prioritizes each virtual machine based on the determined priorities of the applications in each virtual machine, and dynamically adjusts the resource allocation of each virtual machine on the hosting server based on the priority of each virtual machine. The resources of the hosting server can be dynamically allocated to each virtual machine according to the real-time resource requirement of the active applications, and the applications of different virtual machines can negotiate the resource allocation on the hosting server.

24 Claims, 6 Drawing Sheets

METHOD AND APPARATUS OF DYNAMICALLY ALLOCATING RESOURCES ACROSS MULTIPLE VIRTUAL MACHINES

CROSS-REFERENCE TO RELATED APPLICATION

This application claims priority under 35 U.S.C. §119 from Chinese Patent Application No. 200810004964.8 filed Jan. 31, 2008, the entire contents of which are incorporated herein by reference.

BACKGROUND OF THE INVENTION

1. Field of the Invention

The present invention relates to a method and apparatus for dynamically allocating resources across multiple virtual machines (VM).

2. Description of Related Art

In the present information technology (IT) industry, virtualization has become a widely used technology. By lowering a customer's total cost of ownership and improving application reliability and flexibility, virtualization technology offers a way to consolidate multiple virtual machines onto a large server. Thus, customers can reduce the need to over-provision resources for individual workload spikes. Moreover, virtualization technology is helpful in isolating important applications, so that different applications running on different virtual machines do not share operating systems. Therefore, a critical failure caused by one application does not affect any of the other applications. This is very critical in today's business environment which requires servers to be continuously running.

IBM has adopted virtualization technology in a number of technical solutions. FIG. 1 shows a system block diagram of an existing Xen virtual machine. In each Xen Host Platform, there are a number of Xen virtual machines. In each virtual machine, an IBM Websphere Application Server (WAS) is running, and a number of business activities are distributed to different virtual machines. In such a scenario, different business activities are categorized and isolated.

Although the existing virtualization technology can categorize and isolate different business activities, the hosting server cannot sense resource requirement changes of each virtual machine in real-time. In the prior art, the resources of the hosting server, such as CPU and memory, are allocated to each virtual machine according to a predetermined static scheme. For example, when a virtual machine is created, the virtual machine is allocated a certain amount of resources, and during the lifecycle of the virtual machine, the resource allocation is usually not changed. However, such a predetermined resource allocation scheme does not meet the requirements of some applications.

FIG. 2 shows a converged and integrated hosting server for a Telecommunications corporation containing different types of services in the prior art. The Web server and the database service are transaction-based services, which can sustain certain delays but are sensitive to transaction failures. On the other hand, the conference server and Session Initiation Protocol (SIP) server are real-time multimedia services, which can sustain certain data loses but are sensitive to data delays. Therefore, in view of resource consumption, the conference service needs a higher priority to guarantee Quality of Service (QoS). But when the conference activity is ended, in order to support lower-priority services, the conference server should release its resources to the other services on the hosting server. However, the currently available virtualization implementations do not support such dynamic resource allocation because the conference server does not release its resources to the other services.

SUMMARY OF THE INVENTION

An object of the present invention is to provide a method and apparatus for dynamically allocating resources across multiple virtual machines.

According to an aspect of the present invention, a method for dynamically allocating resources across multiple virtual machines is provided. The method, includes the steps of:
monitoring activities of applications in each virtual machine running on a hosting server;
determining priorities of the applications in each virtual machine, based on the monitored activities of the applications;
prioritizing each virtual machine, based on the determined priorities of the applications in each virtual machine; and
dynamically adjusting the resources allocated to each virtual machine by the hosting server, based on the priority of each virtual machine.

According to another aspect of the present invention, an apparatus for dynamically allocating resources across multiple virtual machines is provided. The apparatus includes:
a virtual machine activity monitor in a virtual machine for monitoring the activities of applications in each virtual machine running on a hosting server;
an application priority module for determining priorities of the applications in each virtual machine, based on the monitored activities of the applications;
a virtual machine priority module in the hosting server for prioritizing each virtual machine, based on the determined priorities of the applications in each virtual machine; and
a resource arbiter in the hosting server for dynamically adjusting the resources allocated to each virtual machine, according to the priority of each virtual machine.

According to the present invention, the resources of the hosting server can be dynamically allocated to each virtual machine according to the real-time resource requirements of the active applications. By prioritizing the applications, the resources needed by applications of different virtual machines can be negotiated on the hosting server.

Further, the present invention improves the resource utilization for the hosting server. Since the resources are allocated in an on-demand manner, it balances the resources consumed by running applications from different virtual machines. The non-active applications may release their resources to support other active applications.

Still further, the resource allocation scheme according to this embodiment of the present invention does not affect the application and isolation of the virtualization, as it is unnecessary to modify the applications. Different applications can negotiate for resources on the hosting server, and isolation of the application can still be preserved.

DETAILED DESCRIPTION OF THE PREFERRED EMBODIMENTS

Preferred embodiments of the invention are described in detail below, by way of example only, with reference to the following drawings.

Any disclosed embodiment can be combined with one or several of the other embodiments shown and/or described. This is also possible for one or more features of the embodiments.

Figure 1:
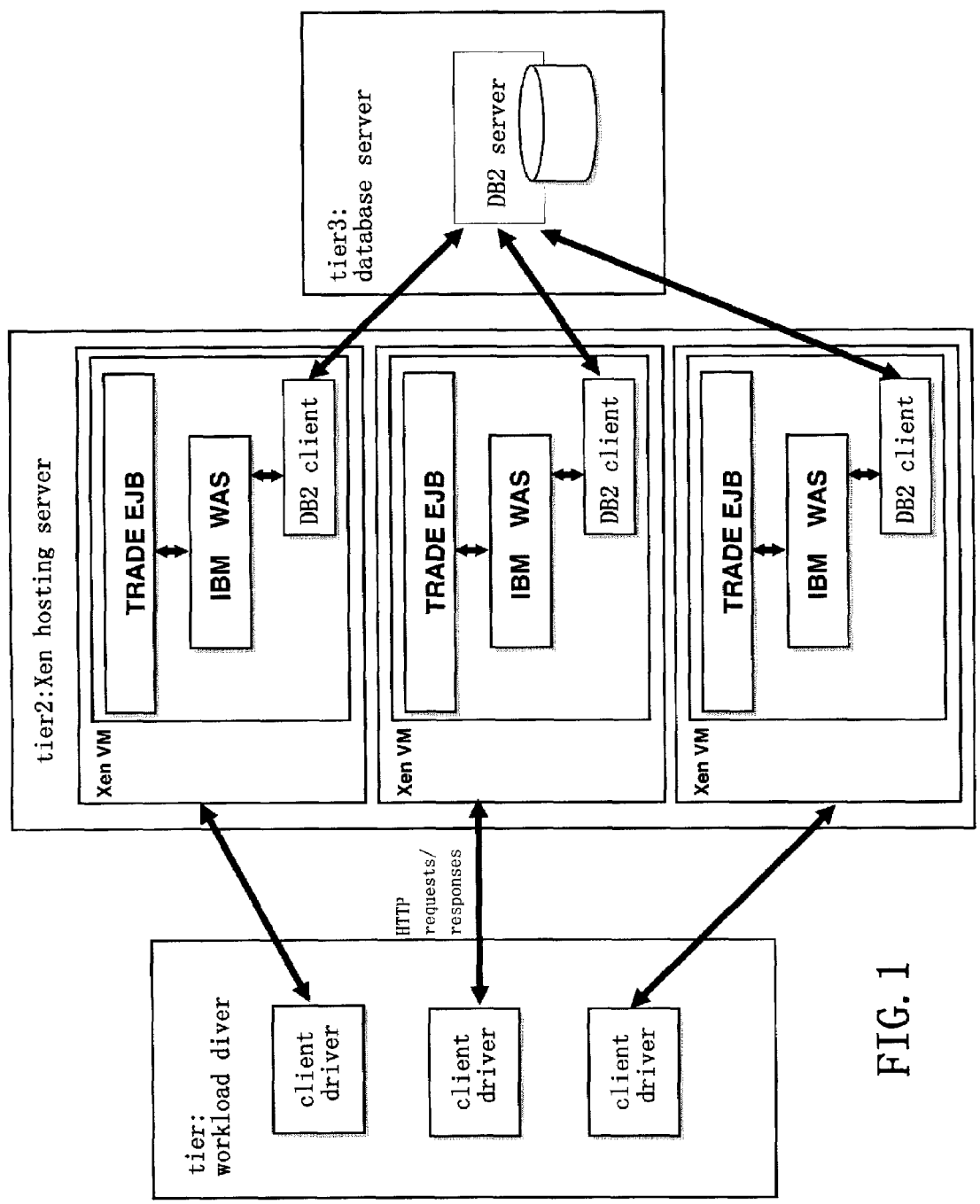
FIG. 1 is a system block diagram illustrating an existing Xen virtual machine.
Figure 2:
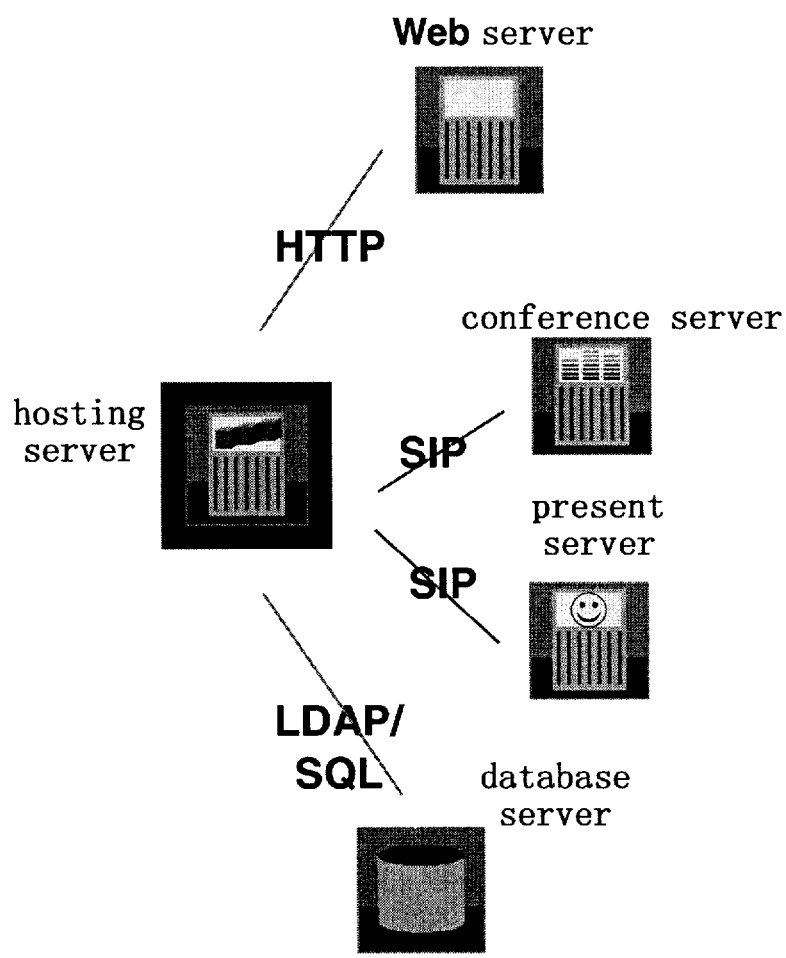
FIG. 2 shows an existing converged and integrated hosting server for a Telecom containing different types of services.
Figure 3:
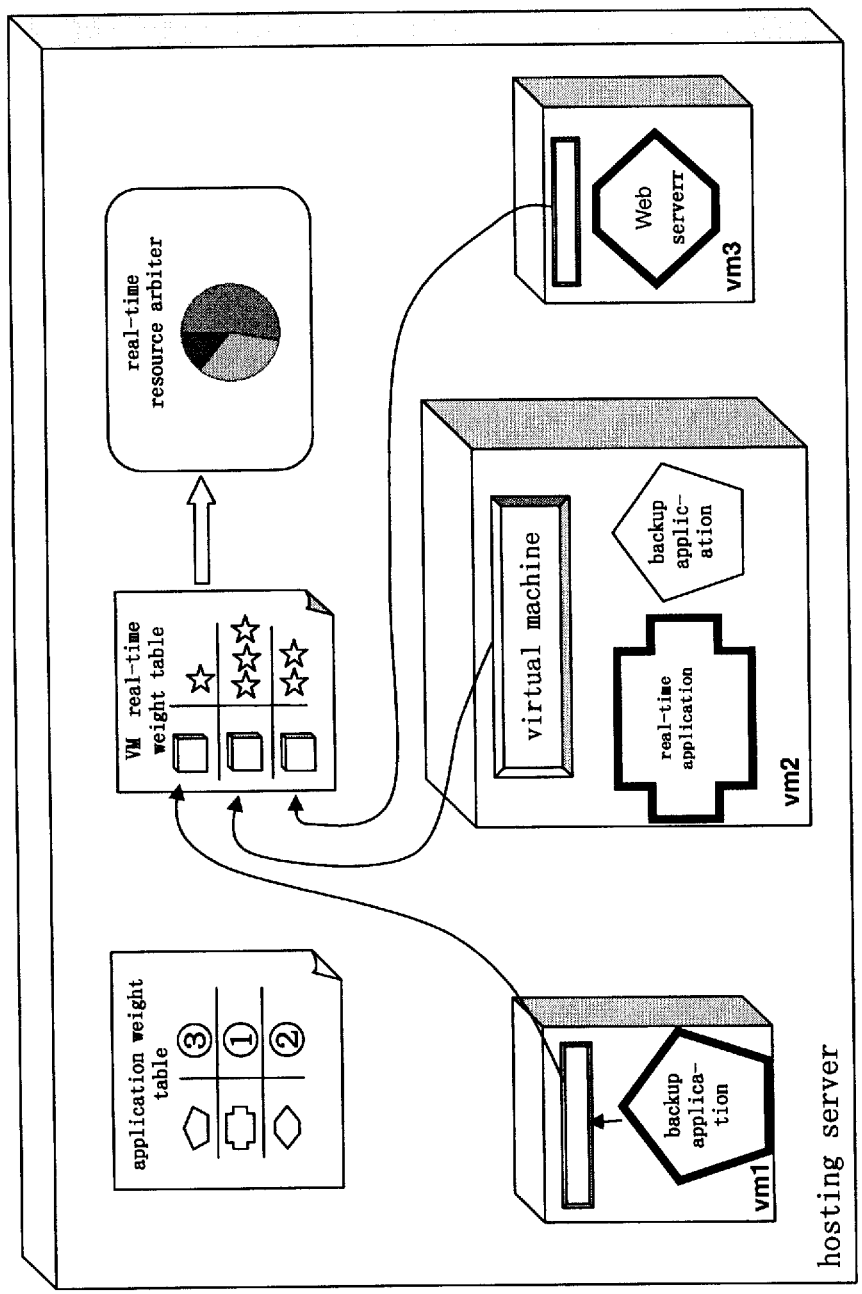
FIG. 3 is a schematic diagram illustrating the prioritization of the virtual machine based on the priority of each application in the Xen hosting server.

A preferred embodiment of the invention includes a method for dynamically allocating resources across multiple virtual machines achieved by the utilization of a Xen hosting server. FIG. 3 is a schematic diagram showing the process of prioritizing the virtual machine based on the priority of each application in the Xen hosting server. As shown in FIG. 3, the real-time multimedia application has the highest priority, the Web server has the higher priority, and the backup applications have the lowest priority. In a specific embodiment, different applications' activities are ranked according to their business requirements. The priorities of these applications are set in an application weight table in advance, and a system administrator may preset and adjust the priorities of different applications according to different requirements.

Figure 4:
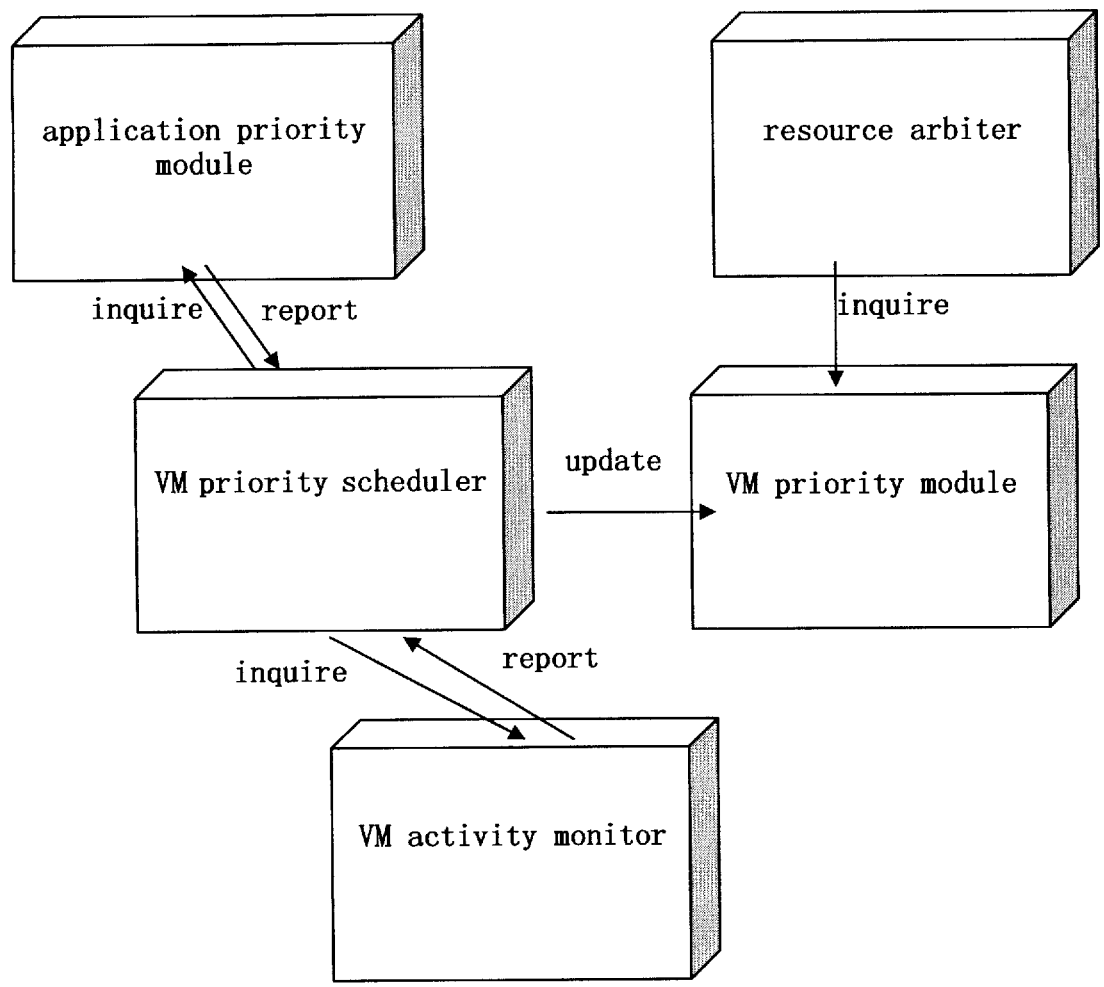
FIG. 4 is a block diagram of an apparatus for dynamically allocating resources across multiple virtual machines according to an embodiment of the present invention.

FIG. 4 is a block diagram of an embodiment of the invention which includes an apparatus for dynamically allocating resources across multiple virtual machines according to an embodiment of the present invention. As shown in FIG. 4, the apparatus for dynamically allocating resources across multiple virtual machines according to an embodiment of the present invention may include: a virtual machine activity monitor running in each virtual machine, an application priority module for prioritizing applications in the virtual machine, a virtual machine priority module for prioritizing each virtual machine in the Xen hosting server, a virtual machine priority scheduler and a resource arbiter.

According to the technical solution of this invention, the virtual machine activity monitor monitors activities of applications in each virtual machine running on the hosting server. Based on the monitored activities of the applications, the application priority module determines priorities of the applications in each virtual machine by looking up an application weight table stored in the application priority module. The virtual machine priority module prioritizes each virtual machine based on the determined priorities of the applications in each virtual machine. The resource arbiter dynamically adjusts the resources allocated to each virtual machine according to the priority of each virtual machine.

Next, the apparatus for dynamically allocating resources across multiple virtual machines according to an embodiment of the present invention will be described in combination with the specific embodiments and with reference to FIG. 4.

In FIG. 4, the virtual machine activity monitor running in each virtual machine is shown. The function of the virtual machine activity monitor is to monitor the activity of applications in each virtual machine running on the hosting server. By monitoring the activity of each application, each virtual machine will have an overview of the real-time resource requirements of each application. In an embodiment of the invention, the virtual machine may use Microsoft's Windows Task Manager to monitor the activity of each application in an actual deployment.

It should be noted that, the application weight table as shown in FIG. 3 is contained in the application priority module as shown in the FIG. 4, and the virtual machine real time weight table as shown in the FIG. 3 is contained in the virtual machine priority module as shown in the FIG. 4. In an embodiment of the present invention, the priority of a virtual machine may be determined based on the priorities of the applications running on the virtual machine.

In the block diagram of FIG. 4, the resource arbiter may communicate with the virtual machine priority module in real time. In one embodiment, inter-module communication technology, such as inter-thread communication technology and inter-process communication technique, may be adopted to achieve real-time communication. The function of the resource arbiter is to dynamically allocate resources, such as CPU, to different virtual machines based on the priorities of different virtual machines. Based on real-time priority monitoring, higher priority active applications can get more resources. Further, the function of the virtual machine priority scheduler in FIG. 4 is to update the virtual machine priority module based on the resources available on the hosting server as well as the application weight table, which allows the virtual machine priority scheduler to manage the different virtual machines on the hosting server.

For example, as shown in FIG. 4, in a preferred embodiment of the present invention, the above modules can make a real-time communication to transmit an inquiry or a report among these modules by using Windows inter-module communication technology, such as inter-thread communication technology and inter-process communication technology.

Next, the specific steps of a method in accordance with an embodiment of the invention will be described with reference to FIG. 5.

Figure 5:
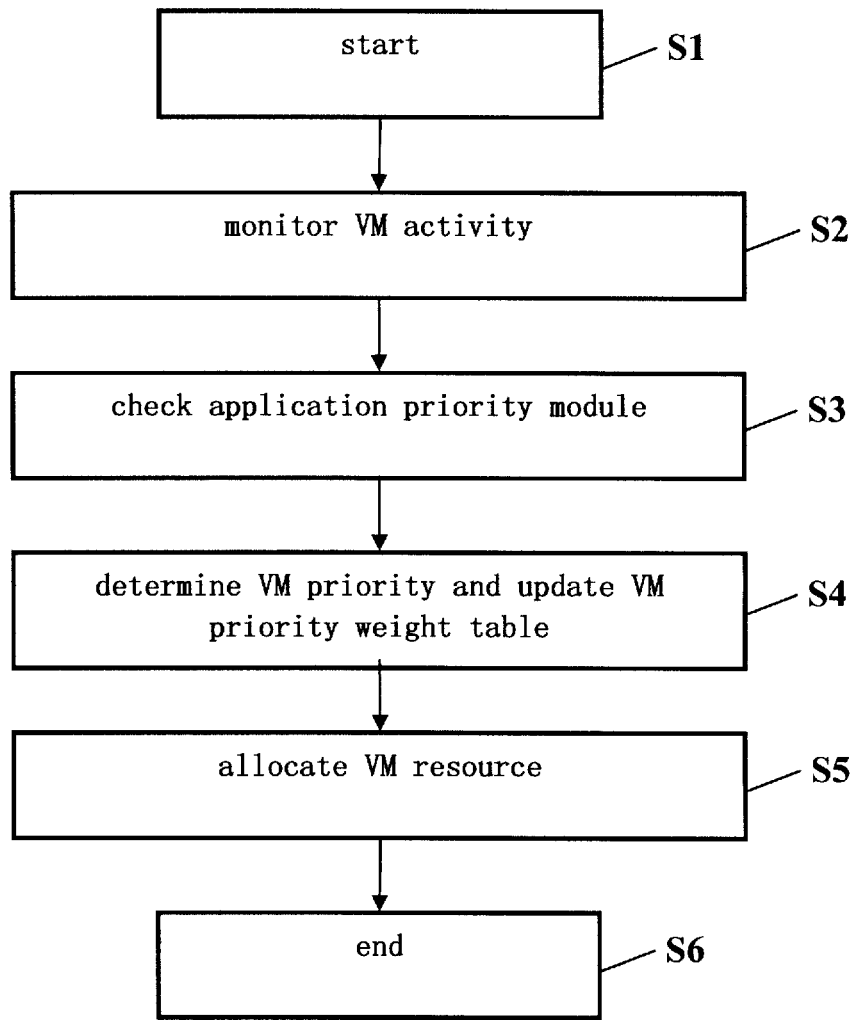
FIG. 5 is a flowchart showing a method for dynamically allocating resources across multiple virtual machines according to the present invention.

FIG. 5 is a flowchart showing the method for dynamically allocating resources across multiple virtual machines according to an embodiment of the present invention. According to the flowchart in FIG. 5 at step S2, each virtual machine activity monitor in each virtual machine monitors the activity of its virtual machine. At step S3, based on the monitored activities, the application priority module determines the priorities of applications running on the virtual machine. At step S4, the virtual machine priority module prioritizes each virtual machine based on the determined priorities of the applications in each virtual machine. In a preferred embodiment of the present invention, the virtual machine priority is determined in accordance with the priority of the application with the highest priority in the virtual machine. Then, at step S5, the resource arbiter in the hosting server adjusts the resources allocated to each virtual machine dynamically based on the determined priority of each virtual machine.

Figure 6:
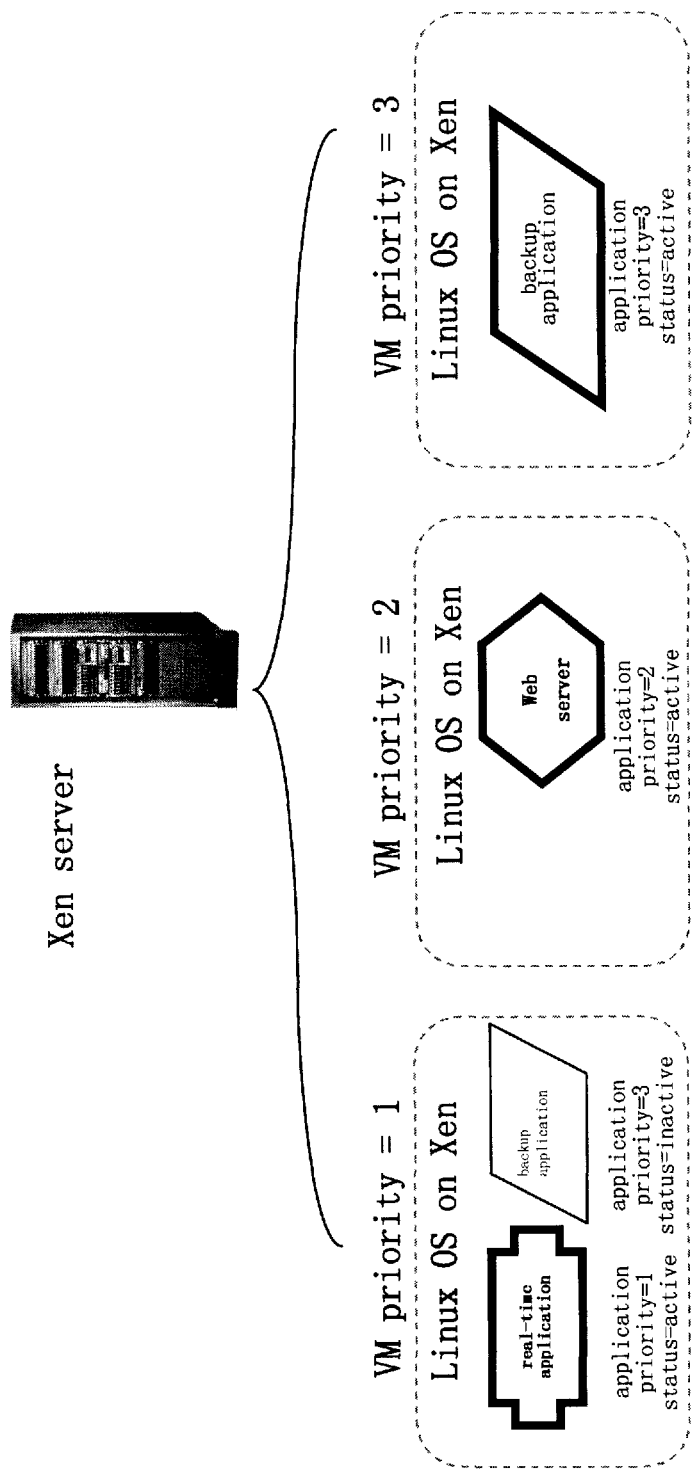
FIG. 6 shows an example of resource allocation according to an embodiment of the present invention.

FIG. 6 shows an example of resource allocation according to an embodiment of the present invention. In this example, there are three virtual machines on the Xen hosting server, wherein a backup application and a multimedia application are running in virtual machine 1, a Web server application is running in virtual machine 2, and a backup application is running in virtual machine 3. In the preferred embodiment of the present invention, the real-time multimedia application has the highest priority, the backup applications have the lowest priority, and the Web server application has a priority higher than the backup application's priority and lower than the real-time multimedia's priority.

In an actual operation, the virtual machine activity monitor in each virtual machine monitors the active applications in the virtual machine. Since different applications have their own behaviors, sometimes an application is active, and at other times the application is inactive. In virtual machine 1 shown in FIG. 6, the backup application is inactive, while the other applications are active. The virtual machines are prioritized according to the running applications, where virtual machine 1 is ranked with priority 1, virtual machine 2 is ranked with priority 2, and virtual machine 3 is ranked with priority 3. The Xen hosting server adjusts the resources allocated to each virtual machine according to the virtual machine's priority: virtual machine 1 will get more resources than virtual machine 2 and 3. Therefore, the running multimedia application gets more resources than the Web server and the backup applications.

Next, a preferred embodiment of the present invention will be further described with reference to FIGS. 3-5, to illustrate the specific processes used by the hosting server in order to dynamically allocate resources, such as CPU, to multiple virtual machines.

In this embodiment, assume that there are three virtual machines on a hosting server, with each virtual machine having predetermined priorities 1, 2 and 3 respectively. The hosting server is on a Windows platform. In this case, each virtual machine can be treated as an application of the hosting server, and hence, can also be treated as a process of the Windows operating system. In this embodiment, the virtual machine activity monitor is the Task Manager of the Windows operating system.

Specifically, the preferred embodiment has the following steps:
(1) The Task Manager monitors the activities of the applications in each virtual machine running the hosting server.
(2) Based on the activities of the monitored applications, the application priority module lookups the application weight table stored therein to determine the priorities of the applications in each virtual machine. The application weight table, located in the application priority module, contains the predetermined priority of each application. A weight is a predetermined parameter, which represents the virtual machine's priority for resources when a CPU competition conflict occurs.
(3) Since different applications have their own behaviors, sometimes, an application is active, and at other times, the application is inactive. For example, in the preferred embodiment, when the system is booted, the multimedia application has priority 1 and is inactive. When triggered, the multimedia application will become into active status, and then it is needed for the hosting server to adjust resource allocated to the multimedia application.

According to an embodiment of the present invention, when the activity status of an application in the virtual machine changes, the Task Manager will report the change to the virtual machine priority module in the hosting server.
(4) The virtual machine priority module prioritizes each virtual machine based on the determined priorities of the applications in each virtual machine. Specifically, when the virtual machine priority module has received the report, it lookups the application weight table to determine the priority of each application, and then, calculates the weight of each virtual machine based on the determined priorities of the applications, so as to re-determine the priority of each virtual machine.
(5) In this embodiment of the invention, the virtual machine priority module may communicate with the resource arbiter in real time, and therefore, the virtual machine priority module can transmit the re-determined priority of each virtual machine to the resource arbiter.
(6) Based on the re-determined priority of each virtual machine, the resource arbiter dynamically adjusts the resources allocated to each virtual machine. Specifically, the resource arbiter dynamically adjusts the resource allocated to each virtual machine, by invoking a function to re-determine priority of different virtual machine.

Specifically, the resource arbiter will invoke function SetPriorityClass( ) to set its parameter to one of the following parameters in order to re-determine the priority of virtual machine: HIGH_PRIORITY_CLASS, IDLE_PRIORITY_CLASS, NORMAL_PRIORITY_CLASS and REAL-TIME_PRIORITY_CLASS.

The following process priority-related functions have been provided in the Windows API:
(1) CreateProcess for creating a process, and setting priority of a process;
(2) GetPriorityClass for obtaining priority of a process;
(3) SetPriorityClass for updating priority of a process.

These functions employ parameter dwCreationFlags to control the priority of the process, which is used to determine the priority of thread scheduling of the process.

Next, a detail description to the above four priority parameters will be given:
Priority: HIGH_PRIORITY_CLASS
Meaning: indicating that a process with this priority will execute a time critical task, and the process must be run at once to ensure its validity. The process with such a priority has priority over the process with priority NORMAL_PRIORITY_CLASS, or the process with priority IDLE_PRIORITY_CLASS. One example of the application with such a priority is the Windows Task List. In order to ensure an immediate response when invoked by user, the consideration to system load is abandoned. This application should careful enough to make sure to use this high priority, because a CPU-related application program with a high priority might occupy almost all of the available CPU cycles.
Priority: IDLE_PRIORITY_CLASS
Meaning: indicating that a thread of the process can run only when the system is idle, and can be interrupted by any process with a higher priority. An example of such a program is a screen saver program. The priority IDLE_PRIORITY_CLASS can be inherited by the sub-processes of the process.
Priority: NORMAL_PRIORITY_CLASS
Meaning: indicating that a process with this priority does not have any special task scheduling requirement.
Priority: REALTIME_PRIORITY_CLASS
Meaning: indicating that a process with this priority has the highest priority. The threads of the process with this priority can interrupt all the threads of other process, including the system process, which is running to execute an important task. For example, a real-time process running for a longer time may cause the lack of caches of hard disk or a slower response of the mouse.

Next, another preferred embodiment of the present invention will be further described with reference to FIGS. 3-5 to illustrate the specific process of dynamically allocating resource across multiple virtual machines, using network I/O as an example. In this embodiment, the virtual machine activity monitor is a network activity monitor.

The preferred embodiment comprises the following steps:
(1) The network activity monitor in each virtual machine monitors activities of applications in each virtual machine running on the hosting server, that is, monitors sockets called in different applications running in the virtual machine.

(2) Based on the monitored activities of the applications, the application priority module lookups the application weight table stored therein to determine the priorities of the applications in each virtual machine. The application weight table, in which the predetermined priority of each application is included, is contained in the application priority module. The weight of an application is a predetermined parameter, representing the priority of resource occupation of the application when a network resource (typically bandwidth) competition conflict occurs.

(3) Since different applications have their own behaviors, sometimes, an application is active, and at other times, the application is inactive. For example, in the preferred embodiment, when the system is booted, the multimedia application has priority 1, and is inactive. When triggered, the multimedia application will become into active status, and then it is needed for the hosting server to adjust resource allocated to the multimedia application.

According to an embodiment of the present invention, when the activities of applications running in each virtual machine have changed, the network activity monitor in each virtual machine transmits the sockets used in the active application in the virtual machine to the virtual machine priority module in the hosting server.

(4) Based on the determined priority of the applications in each virtual machine, the virtual machine priority module prioritizes each virtual machine. Specifically, the virtual machine priority module will map the sockets of the virtual machine into the sockets of hosting server, to obtain the socket of hosting server occupied by each active application. Then, the application weight table is checked to determine the priority of each active application, so that the priorities of the hosting server's different sockets can be obtained, and the virtual machines can be re-prioritized.

The virtual machine real-time weight table is contained in the virtual machine priority module, and includes the mapping between the sockets of the active application in the virtual machines and the sockets of the hosting server.

(5) In this embodiment of the invention, the virtual machine priority module may communicate with the resource arbiter in real time, and therefore, the virtual machine priority module can transmit the re-determined priorities of each virtual machine to the resource arbiter.

(6) Based on the determined priority of each virtual machine, the resource arbiter dynamically adjusts the resources allocated to each virtual machine. Specifically, based on the priority of the sockets recorded in the virtual machine real-time weight table, the resource arbiter will adjust the network bandwidth allocation in real time.

In one preferred embodiment, the real-time adjustment of the network bandwidth allocation comprises the following actions:

(1) intercepting a data packet in the IP layer;
(2) based on the IP/port/type of network protocol of the data packet, identifying unique relationship between the data packet and a hosting server socket, to determine which hosting server socket it belongs to;
(3) if bandwidth consumed by the hosting server socket, which the data packet belongs to, does not exceed a predetermined bandwidth, the data packet is passed, otherwise, the data packet waits in a queue to be passed for a certain time period.

Specifically, the technical details of the above preferred embodiment will be described by means of the Windows platform in combination with an example. Assume that the hosting server has 100 Mbps network bandwidth, the active applications A1, A2 and A3 have corresponding hosting server sockets S1, S2 and S3 and corresponding priorities P1, P2 and P3 respectively. Based on their priorities, the network bandwidth allocated to the applications A1, A2 and A3 are B1=60 Mbps, B2=30 Mbps, B3=10 Mbps respectively. A data packet can be intercepted in the IP layer through driver programming. Next, based on IP address/port/type of protocol (TCP/UDP), a unique relationship between the data packet and the socket can be identified. For example, a data packet belongs to socket S2. The real-time network bandwidth consumption $B2'$ of socket S2 is then calculated. If $B2'<B2$, the actual bandwidth consumption does not exceed the allocated bandwidth, and the data packet is passed. Otherwise, the data packet waits in a queue to be passed for a time period, so that the bandwidth consumption can be reduced.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for dynamically allocating hardware resources across multiple virtual machines, the method comprising the steps of:
    monitoring activities of applications in each given one of the virtual machines running on a hosting server, via a virtual machine activity monitor running in each given one of the virtual machines;
    determining priorities of a set of the applications having an active status in each given one of the virtual machines, based on the monitored activities of the applications, by accessing an application weight table, stored in an application priority module of the hosting server, and containing preset priorities for the applications;
    prioritizing each given one of the virtual machines based on the determined priorities of the applications having the active status in each given one of the virtual machines, by updating a virtual machine priority real-time weight table of a virtual machine priority module in the hosting server, wherein applications having an inactive status do not affect the prioritization; and
    dynamically adjusting those of the hardware resources allocated to each given one of the virtual machines by the hosting server, based on the priority of each virtual machine, by accessing the virtual machine priority real-time weight table with a resource arbiter module in the hosting server, said resource arbiter module being in communication with the virtual machine priority module.

2. The method according to claim 1, wherein the virtual machine activity monitor is a task manager of an operating system.

3. The method according to claim 2, wherein said prioritizing step further comprises the steps of:
    notifying said change to said virtual machine priority module in the hosting server via the task manager upon determining that the activities of the applications in any given one of the virtual machines has changed; and
    re-determining the priority of each given one of the virtual machines by (i) having the virtual machine priority module access said application weight table to determine the priority of each application having the active status; and (ii) calculating the weight of each virtual machine.

4. The method according to claim 3, wherein said dynamically adjusting step further comprises:
  transmitting the re-determined priority of each virtual machine to said resource arbiter in the hosting server using the virtual machine priority module;
  re-assigning priority of each virtual machine by invoking a function; and
  thereafter dynamically re-allocating resources to each given one of said virtual machines using the resource arbiter.

5. The method according to claim 4, wherein the invoked function is function SetPriorityClass( ), and a parameter of the invoked function is set to one of the parameters:
  HIGH_PRIORITY_CLASS,
  IDLE_PRIORITY_CLASS,
  NORMAL_PRIORITY_CLASS, and
  REALTIME_PRIORITY_CLASS,
to re-assign priorities of the virtual machines.

6. The method according to claim 3, wherein a backup application having lowest priority, a Web server application having a higher priority, and a real-time multimedia application having highest priority in the application weight table.

7. The method according to claim 1, wherein, in said monitoring step, the virtual machine activity monitor is a network activity monitor for monitoring sockets.

8. The method according to claim 7, wherein said prioritizing step further comprises the steps of:
  notifying the virtual machine priority module which of said sockets are being used in those of the applications having the active status on the virtual machines in the hosting server if the activities of the applications in any given one of the virtual machines has changed; and
  re-determining the priorities of the virtual machines by (i) mapping the sockets of the virtual machines into the sockets of the hosting server to obtain sockets of the hosting server that are occupied by each active application and (ii) accessing the application weight table to determine the priority of each active application, said re-determined priorities being stored in said virtual machine priority real-time weight table.

9. The method according to claim 8, wherein said dynamically adjusting step further comprises:
  transmitting the re-determined priority of each virtual machine to said resource arbiter module in the hosting server using the virtual machine priority module; and
  adjusting allocation of network bandwidth resources in real time by the resource arbiter module according to the priorities of the sockets recorded in the virtual machine priority real-time weight table.

10. The method according to claim 9, wherein the step of adjusting allocation of network bandwidth resources in real time further comprises the steps of:
  intercepting an IP packet in the IP layer;
  identifying which hosting server socket said IP packet belongs to by using the IP packet's address/port/type of network protocol; and
  passing said IP packet, otherwise, letting said IP packet wait in a queue upon determining that the bandwidth consumed by said hosting server socket does not exceed a predetermined bandwidth.

11. The method of claim 1, wherein said hardware resources comprise central processing unit resources of said hosting server, wherein said dynamically adjusting step comprises dynamically adjusting said central processing unit resources of said hosting server.

12. An apparatus for dynamically allocating resources across multiple virtual machines, the apparatus comprising:
  a central processing unit of a hosting server;
  a storage medium accessible to said central processing unit;
  a virtual machine activity monitor running in each given one of the virtual machines for monitoring activities of applications in each given one of the virtual machines running on a hosting server;
  an application priority module, stored in said storage medium, having an application weight table, and executable by said central processing unit to determine priorities of a set of the applications having an active status in each given one of the virtual machines, based on the monitored activities of the applications, by accessing said application weight table, said application weight table containing preset priorities for the applications;
  a virtual machine priority module, stored in said storage medium, having a virtual machine priority real-time weight table, and executable by said central processing unit to prioritize each given one of the virtual machines, based on the determined priorities of the applications having the active status in each given one of the virtual machines, by updating said virtual machine priority real-time weight table, wherein applications having an inactive status do not affect the prioritization; and
  a resource arbiter, stored in said storage medium, in communication with the virtual machine priority module, and executable by said central processing unit to dynamically adjust hardware resources allocated to each given one of the virtual machines, according to the priority of each virtual machine, by accessing the virtual machine priority real-time weight table.

13. The apparatus according to claim 12, wherein the virtual machine activity monitor in the virtual machine is a task manager of an operating system.

14. The apparatus according to claim 13, further comprising:
  means for, if the activities of the applications in any given one of the virtual machine has changed, notifying said change to said virtual machine priority module via the task manager; and
  means for re-determining the priority of each given one of the virtual machines by having the virtual machine priority module access said application weight table to determine the priority of each application and calculating the weight of each virtual machine.

15. The apparatus according to claim 14, wherein:
  the virtual machine priority module transmits the re-determined priority of each virtual machine to the resource arbiter;
  the resource arbiter re-assigns priorities of different virtual machines by invoking a function, and
  then dynamically re-allocating resources to each given one of said virtual machines.

16. The apparatus according to claim 15, wherein the invoked function is SetPriorityClass( ), and a parameter of the invoked function is set to one of the parameters:
  HIGH_PRIORITY_CLASS,
  IDLE_PRIORITY_CLASS,
  NORMAL_PRIORITY_CLASS, and
  REALTIME_PRIORITY_CLASS,
to re-assign the priorities of the virtual machines.

17. The apparatus according to claim 14, wherein a real-time multimedia application has the highest priority, a Web server application has a higher priority, and a backup application has the lowest priority in the application weight table.

18. The apparatus according to claim 12, wherein the virtual machine activity monitor is a network activity monitor for monitoring sockets.

19. The apparatus according to claim 18, wherein:
the network activity monitor notifies the virtual machine priority module in the hosting server of those of the sockets used by those of the applications having the active status in the virtual machines upon determining that the activities of the applications in any given one of the virtual machines has changed;
further comprising means for re-determining the priorities of the virtual machines by (i) mapping the sockets of the virtual machines that are occupied by each active application to the sockets of the hosting server, (ii) accessing the application weight table to determine which active applications have priority to the hosting server's different sockets and (iii) recording the priorities into the virtual machine priority module.

20. The apparatus according to claim 19, wherein the virtual machine priority module transmits the re-determined priority of each virtual machine to the resource arbiter; and wherein the resource arbiter dynamically adjusts, in real time, the allocation of I/O network bandwidth resources according to the priorities recorded in the virtual machine priority module.

21. The apparatus according to claim 20, wherein said resource arbiter (i) intercepts an IP packet in the IP layer;
(ii) identifies which hosting server socket said IP packet belongs to by using the IP packet's address/port/type of network protocol; and
(iii) passes said IP packet, otherwise, lets said IP packet wait in a queue upon determining that the bandwidth consumed by said hosting server socket does not exceed a predetermined bandwidth.

22. The apparatus of claim 12, wherein said hardware resources dynamically adjusted by said resource arbiter comprise resources of said central processing unit of said hosting server.

23. A computer readable article of manufacture tangibly embodying, in a non-transitory manner, computer readable instructions for causing a data processing system to execute a computer implemented method for dynamically allocating hardware resources across multiple virtual machines, the method comprising the steps of:
monitoring activities of applications in each given one of the virtual machines running on a hosting server, via a virtual machine activity monitor running in each given one of the virtual machines;
determining priorities of a set of the applications having an active status in each given one of the virtual machines, based on the monitored activities of the applications, by accessing an application weight table, stored in an application priority module of the hosting server, and containing preset priorities for the applications;
prioritizing each given one of the virtual machines based on the determined priorities of the applications having the active status in each given one of the virtual machines, by updating a virtual machine priority real-time weight table of a virtual machine priority module in the hosting server, wherein applications having an inactive status do not affect the prioritization; and
dynamically adjusting those of the hardware resources allocated to each given one of the virtual machines by the hosting server, based on the priority of each virtual machine, by accessing the virtual machine priority real-time weight table with a resource arbiter module in the hosting server, said resource arbiter module being in communication with the virtual machine priority module.

24. The article of manufacture of claim 23, wherein said hardware resources comprise central processing unit resources of said hosting server, wherein said dynamically adjusting step comprises dynamically adjusting said central processing unit resources of said hosting server.

* * * * *